United States Patent [19]
Peterson et al.

[11] Patent Number: 5,482,365
[45] Date of Patent: Jan. 9, 1996

[54] RUBBER GROUSERED TRACK SHOE

[75] Inventors: Thomas L. Peterson, Peoria; Larry K. Rhodes, Pekin; Thomas C. Robertson, Creve Coeur; David L. Skinner, Metamora, all of Ill.

[73] Assignee: Caterpillar Inc., Peoria, Ill.

[21] Appl. No.: 274,529

[22] Filed: Jul. 13, 1994

[51] Int. Cl.[6] ............................................. B62D 55/275
[52] U.S. Cl. ........................... 305/54; 305/46; 305/51
[58] Field of Search ............................. 305/39, 46, 51, 305/54

[56]     References Cited

U.S. PATENT DOCUMENTS

| | | |
|---|---|---|
| 1,314,722 | 9/1919 | White . |
| 2,312,072 | 3/1940 | Broadwater ............................ 305/10 |
| 2,686,697 | 8/1954 | Baker ................................. 305/51 X |
| 3,475,060 | 10/1969 | Kaifesh ............................... 305/46 X |
| 4,470,641 | 9/1984 | Swarthout ............................ 305/54 X |
| 4,586,757 | 5/1986 | Bloechlinger ........................ 305/54 X |
| 4,694,556 | 9/1987 | Hewitt ................................ 305/51 X |
| 4,842,345 | 6/1989 | Elder et al. .......................... 305/35 |
| 5,261,733 | 11/1993 | Hara ................................... 305/46 |

FOREIGN PATENT DOCUMENTS

| | | | |
|---|---|---|---|
| 1137333 | 9/1962 | Germany ............................ 305/35 R |
| 3802914 | 8/1989 | Germany ............................ 305/46 |
| 0040428 | 3/1979 | Japan ................................. 305/35 R |
| 4345583 | 10/1992 | Japan ................................. 305/51 |
| 1404402 | 6/1988 | U.S.S.R. ............................ 305/54 |

OTHER PUBLICATIONS

Pamphlet entitled "Cushotrac Rubber & Polyurethane Trac Pads for all Crawlers" published by Superior Tire & Rubber Corp. No Date.

*Primary Examiner*—Russell D. Stormer
*Attorney, Agent, or Firm*—O. Gordon Pence

[57]                ABSTRACT

A long life rubber grousered track shoe for track-type machines is disclosed. The track shoe has a steel shoe portion and a rubber grouser portion that is molded in situ to the steel shoe portion between a pair of steel grouser bars to protect the rubber grouser from undue shear loads.

6 Claims, 2 Drawing Sheets

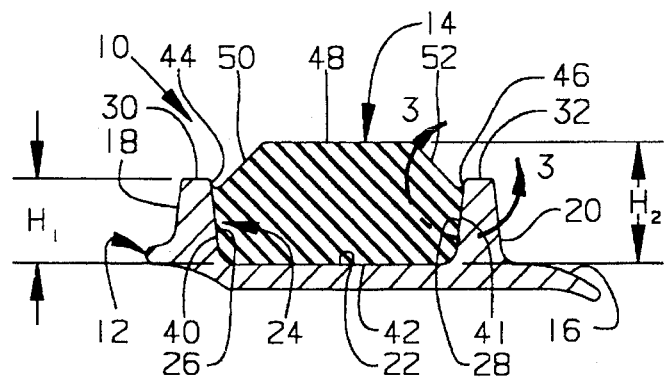
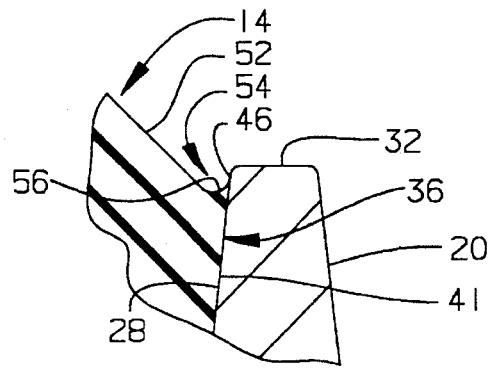
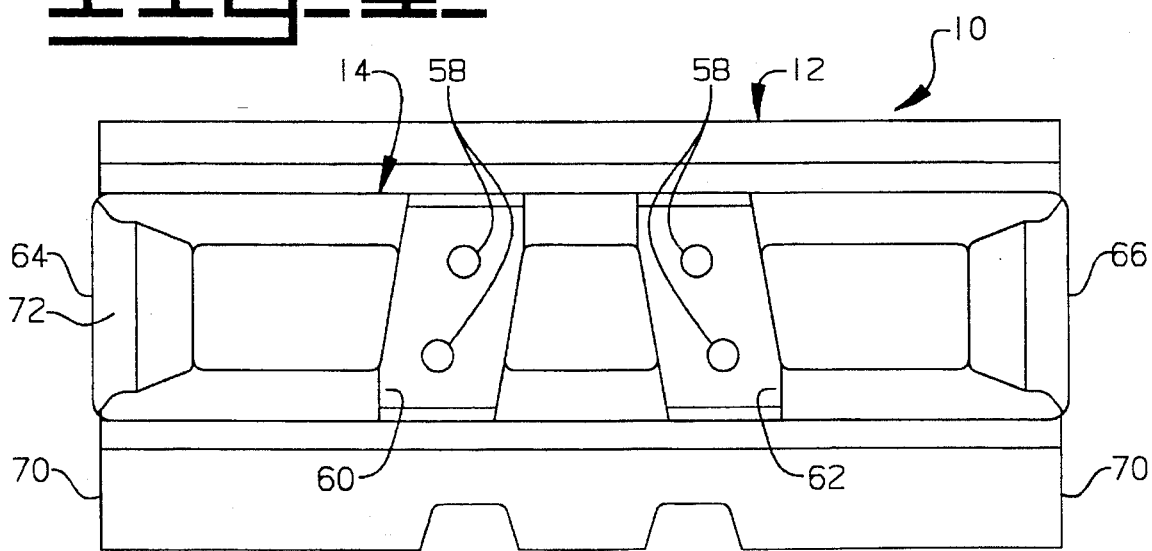

RUBBER GROUSERED TRACK SHOE

TECHNICAL FIELD track for track-type machines and, more particularly to a rubber grousered track shoe that provides tractive penetration in soil, but will not cause permanent damage to asphalt or other finished road surfaces.

BACKGROUND ART

Track-type machines, such as track loaders, are frequently used in applications where the machine must be moved from one job site to another along or across paved roads. One such application is the use of track loaders for preparing building sites and earthworking applications for new homes in residential or buildings in commercial locations and the like. Such work can require a great deal of machine mobilization from one job site to another. Once the streets or parking lots have been completed, machine mobilization becomes a significant problem for track machines equipped only with steel track shoes, as they can then no longer be driven on such paved surfaces without causing significant damage to such surfaces. As a consequence, bridging material must be laid across the street or the track loader must be trucked on a trailer to its next job site. Either of these alternatives are quite time consuming and costly.

Others have attempted to solve this lack of mobility problem by attaching rubber pads to the track shoes by some type of fasteners or clamping devices. Some of such prior art devices are exemplified by the following patents: British Patent No. 1,016,757 issued Jan. 12, 1966; German Patent No. 1,152,631 issued Aug. 8, 1963; U.S. Pat. No. 1,314,722 issued Sep. 2, 1919; U.S. Pat. No. 3,058,783 issued Oct. 16, 1962; and U.S. Pat. No. 4,448,459 issued May 15, 1984 to the Assignee hereof. Heretofore, however, such prior art devices suffered from extremely short lives due to premature failures due to stresses on the rubber, causing the chucking out of large pieces of the rubber from the pads, or due to bond failure between the rubber and the member to which it was bonded.

The present invention is directed to overcoming the shortcomings of the prior attempts by providing a rubber grouser portion that is molded directly to and between a pair of steel grouser bars on a steel track shoe. Direct molding of the rubber grouser to the track shoe is advantageous because it eliminates the expense of separate attaching hardware and requires no modification of the track shoe to receive such hardware. A further advantage of the present invention is that when the rubber grouser portion wears down, so as to no longer be useful for roading, the rubber can be removed. Once this is accomplished, the remaining steel track shoe is essentially new and can be used in any application where roading across paved streets is not required.

DISCLOSURE OF THE INVENTION

In accordance with one aspect of the present invention, there is provided a rubber grousered track shoe for track-type machines that includes an elongated steel shoe portion and a rubber grouser portion. The steel shoe portion has a ground engaging side with at least two upstanding, laterally spaced apart steel grouser bars extending outwardly from the ground engaging side and in a lengthwise orientation across the shoe. A planar surface is disposed between a first one of the steel grouser bars and a second one of such grouser bars and forms a protective channel between the bars. The first and second steel grouser bars each have a side facing an opposing side of the other steel grouser bar and each has a tip at its distal end. The rubber grouser portion is molded in situ on the track shoe between the first and second grouser bars. The rubber grouser portion has an inner portion and an outer portion. The inner portion is located within the protective channel and has a first side, a bottom, and a second side, each contiguous along and bonded to the side of the first steel grouser bar, the planer surface and the side of the second steel grouser bar, respectively. The outer portion extends above the protective channel and has a first side face, a second side face, and a planer ground engaging top face. The top face is oriented parallel to the planer surface of the shoe portion and the side faces extend from the top face toward the inner portion of the rubber grouser portion. Each of the side faces are joined to a respective one of the sides of the inner portion at a juncture located below the tips of their adjacent steel grouser bars.

BRIEF DESCRIPTION OF THE DRAWINGS

FIG. 2 is a transverse cross-sectional view of the rubber grousered track shoe taken along line 2.2 in FIG. 1.

FIG. 3 is a diagrammatic cross-sectional view of a portion of the rubber grousered track shoe, taken generally in the area of lines 3—3 in FIG. 2; and FIG. 4 is a diagrammatic top plan view of the subject rubber grousered track shoe.

BEST MODE FOR CARRYING OUT THE INVENTION

Figure 1:
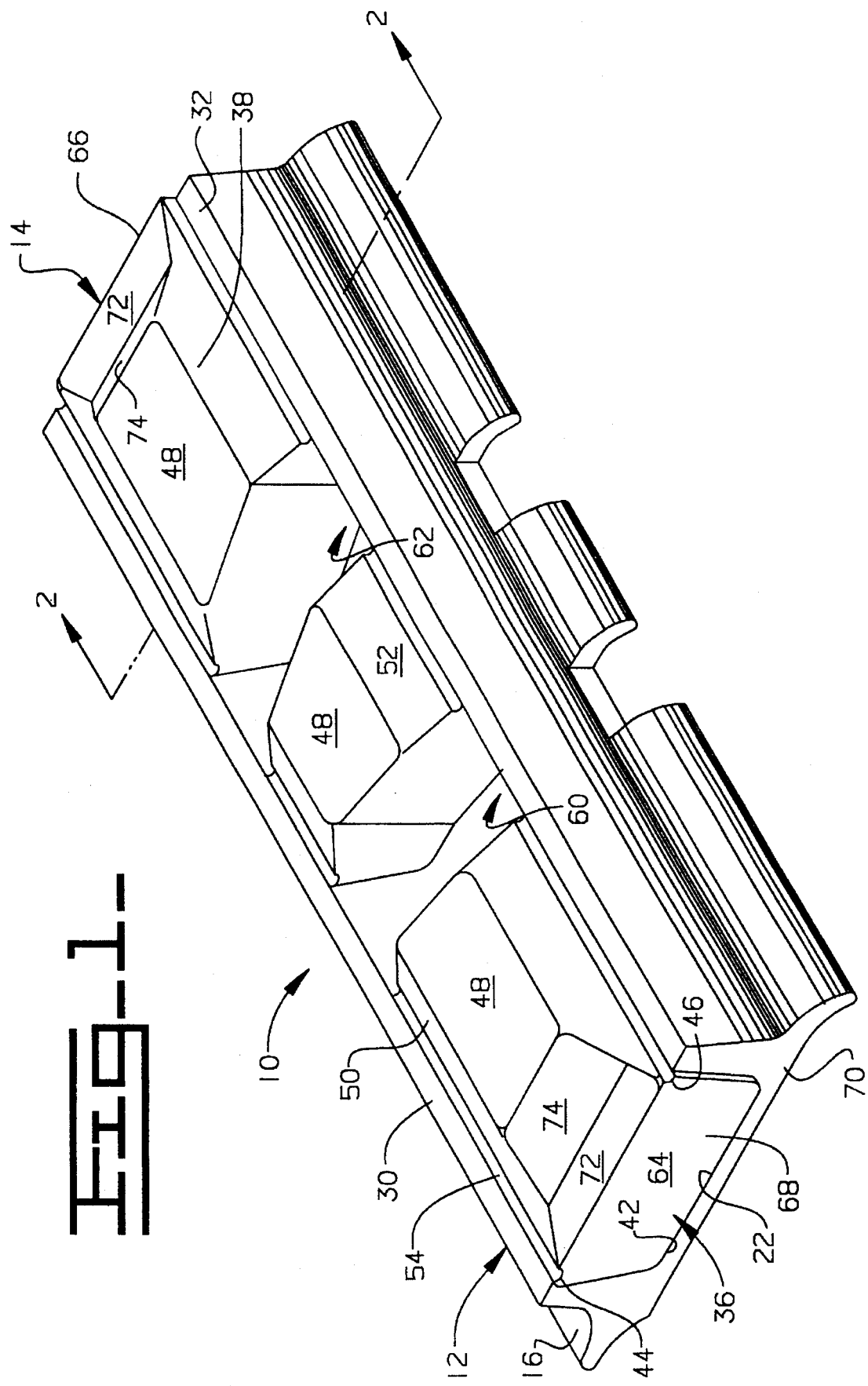
FIG. 1 is a perspective elevational view of a rubber grouser track shoe embodying the principles of the present invention.

Referring more particularly to the drawings, a rubber grousered track shoe embodying the principles of the present invention is generally indicated at 10 in FIGS. 1 and 2 for use on a track-type machine, such as a track loader, not shown. The rubber grouser track shoe 10 includes an elongated steel shoe portion 12 and a rubber grouser portion 14.

The steel shoe portion 12 depicted in the drawings is what is known as in the industry as a two bar shoe. As shown in FIG. 2, shoe portion 12 has a ground engaging side 16 having at least two upstanding steel grouser bars 18 and 20 extending outwardly from the ground engaging side 16 in a lengthwise orientation across the steel shoe 12. The ground engaging side 16 also has a planer surface 22. The planer surface 22 is disposed between the steel grouser bars 18 and 20 and, with such grouser bars, forms a protective channel 24. The first steel grouser bar 18 has a side 26 facing an opposing side 28 on the second steel grouser bar 20. Each steel grouser bar 18, 20 also has a tip 30, 32, respectively at its distal end. Each side 26, 28 extends from the planer surface 22 to its respective tip 30, 32 at a slightly obtuse angle to the planer surface 22. The steel grouser bars 18, 20 are provided with predetermined equal height $H_1$ above the planer surface 22. Preferably, the height $H_1$ of the steel grouser bars are generally in a range of from 36 and 39 mm in height.

The rubber grouser portion 14 is molded in situ on the steel shoe portion 12 within the protective channel 24 between the first and second steel grouser bars 18 and 20 and along the planer surface 22. The rubber grouser portion 14 is preferably of a wear resistant natural rubber compound to improve its wear life. However, any suitable natural or synthetic rubber compound may be used without departing from the scope of the present invention.

The rubber grouser portion 14 has an inner portion 36 and an outer portion 38 (FIG. 1). The inner portion 36 is that portion in contact with and is bonded to the steel shoe portion 12 and is preferably located wholly within the protected channel 24 at a position below the tips 30, 32 of the steel grouser bars 18 and 20, respectively. To achieve this goal, the lower portion 36 has sides 40 and 41 that extend along the sides 26, 28 of the steel grouser bars 18, 20, respectively, but that stop short of the tips 30, 32 at ends 44 and 46, respectively. A bottom 42 extends between the side 40, 41.

The outer portion 38 is that portion of the rubber grouser portion 14 above the ends 44 and 46 and includes a planer ground engaging top face 48, a first side face 50, and a second side face 52. The top face 48 is oriented generally parallel to the planer surface 22. The rubber grouser portion 14 is provided with a height $H_2$ that is between 1.3 to 1.6 times the height $H_1$ of the steel grouser bars 18, 20. Such height differential ensures that the top face 48 provides the sole contact surface of the track shoe 10 with a smooth hard surface, such as that of a paved street, and keeps the steel grouser bars 18 and 20 from contacting such surface.

The first and second side faces 50, 52 extend from the top face 48 toward the inner portion 36 of the rubber grouser portion 14. Each side face 50, 52 is joined to a respective one of the sides 40, 41 of the inner portion 36 at a juncture 54 as best shown in FIG. 3. Each of such junctures 54 is preferably generated by a radius centered above the inner portion 36 of the rubber grouser portion 14 such that the juncture 54 have a concave configuration along the respective sides 26, 28 of the steel grouser bars 18, 20 with a bottom extremity 56 located below the height of each respective tip 30, 32.

The steel shoe portion 12 is also provided, as is customary, with a set of bolt holes 58, which are disposed through the planer surface 22. Typically, the set consists of four holes for receiving a like number of bolts (not shown) for attaching the shoe 10 to a conventional track chain (also not shown). To facilitate such attachment and ready access to the bolts, the rubber grouser portion 14 is discontinuous about each bolt hole 58. In particular, a pair of open bolt receiving cavities 60, 62 are provided for two pairs of bolt holes, such cavities extending laterally from the side 26 of the first steel grouser bar 18 to the side 28 of the second steel grouser bar 20.

The rubber grouser portion 14 also has opposite ends 64, 66, each of which is provided with a stepped configuration having a vertical portion 68 located adjacent the ends 70 of the steel shoe portion 12 and extending from the bottom 42 of the inner portion 36 to a height approximately equal to the height of the tips 30, 32 of the steel grouser bars 18, 20. A horizontal portion 72 extends inwardly from the vertical portion 68 to an inclined portion 74. The inclined portion 74 then extends from the horizontal portion 72 to the top surface 48 of the outer portion 38 of the rubber grouser portion 14.

INDUSTRIAL APPLICABILITY

The rubber grouser track shoe 10 constructed in accordance with the teachings of the present invention advantageously provides a long lived rubber grouser portion 14 to permit a tracked machine equipped with such shoe 10 to travel across and along paved streets and roads without damaging the paved surface of such streets and roads. This ability is highly sought after by housing contractors and the like because it greatly increases the efficient operation and availability of tracked machines by providing the machines with the mobility to travel from one job site to another without the use of a hauler or the use of bridging materials placed upon the road surface to prevent damage. Rubber pads have not been popular in the past because of premature failures in the rubber. The most prevalent reasons for these failures have been the inability of the rubber to withstand the high stresses resulting from tractive effort produced in digging applications. The short life was not due to the rubber wearing out, but due to the chunking out of large pieces of the rubber or due to bond failures where the rubber was bonded to devices for attaching the rubber pad to the shoe. The chunking problem is reduced in the present invention by reducing sharp corners and blunt edges or faces that are susceptible to high loads. Bond failures initiate along any unprotected edge and will propagate rapidly until the entire rubber pad is lost. The unique construction of the present rubber grouser track shoe is effective in overcoming these problems. First, the rubber grouser portion 14 is disposed in a protective channel 24 between the steel grouser bars 18, 20. This reduces moment arm forces acting on the rubber grouser and its bond to the steel shoe portion 12 as a result of tractive loads. Such tractive loads are oriented in a direction transverse to the shoe. Second, the bond area between the steel shoe portion 12 and the rubber grouser portion 14 is maximized by extending the bond along the planer surface 22 and up both sides 26, 28 of the steel grouser bars 18, 20. Third, the bond edge of the rubber grouser portion 14 is well protected by being located below the tips 30, 32 of the adjacent steel grouser bars 18, 20. In addition, the concave junctures 54 are effective in reducing stresses between the rubber grouser portion 14 and the steel grouser bars 18, 20 along the bond edge, which is most susceptible to early failure.

Also, the inclined side faces 50, 52 help reduce the moment arm forces on the bond edge resulting from tractive efforts. Likewise, the stepped ends 64, 66 similarly reduce shearing stresses caused by turning.

All of the preceding features are preferably created in the molding process where the rubber grouser portion 14 is molded in situ on the steel shoe portion 12, with the steel shoe portion 12 forming one part of the mold for the rubber and a suitably shaped mold shell forming the other part of the mold. Prior to such molding, a suitable rubber bonding agent is applied to the bonding surfaces of the steel shoe portion 12, as is customary in the rubber molding art.

A rubber grouser track shoe 10 constructed in accordance with the teachings of the present invention has a part steel and a part rubber grouser capable of penetration into soil to provide tractive effort for digging and loading purposes. The rubber grouser portion 14 that extends above the steel grouser portion 12 enables the track machine to travel on paved streets without damaging finished road surfaces.

Another useful advantage of the present invention is that after the rubber grouser portion 14 is worn down to the height of the steel grouser bars 18, 20, and thus, can no longer be driven on finished road surfaces, the rubber can be expeditiously removed and the remaining steel track shoe used in another application that does not involve traveling on finished road surfaces. Removal of the remaining rubber of the rubber grouser portion 14 may be accomplished by operating the tracked machine in coarse jagged rock for a short period of time which effectively cuts up the rubber and removes it from the steel shoe portion 12.

Other aspects, objects and advantages of the present invention can be obtained from a study of the drawings, the disclosure and the appended claims.

We claim:

1. A rubber grousered track shoe for track-type machines, comprising:

an elongated steel shoe portion having a ground engaging side with at least two upstanding, laterally spaced apart steel grouser bars extending outwardly from said ground engaging side in a lengthwise orientation across said shoe, a planar surface, disposed between a first one of said steel grouser bars and a second one of said steel grouser bars and a protective channel formed by said first and second grouser bars and said planar surface, said first steel grouser bar having a side facing an opposing side of said second steel grouser bar and each steel grouser bar having a tip at its distal end; and a rubber grouser portion molded in situ on said track shoe between said first and second steel grouser bars, said rubber grouser portion having an inner portion and an outer portion, said inner portion being located within said protective channel and having a first side, a bottom and a second side each contiguous along and bonded to said side of said first steel grouser bar, said planar surface and said side of said second steel grouser bar, respectively, and said outer portion extending above said protective channel and having a first side face, a second side face and a planar ground engaging top face, said top face being oriented parallel to said planar surface of said shoe portion and said side faces extending from said top face toward said inner portion of said rubber grouser portion, each of said side faces being joined to a respective one of said sides of said inner portion at a juncture located below the tip of its adjacent steel grouser bar.

2. The rubber grousered track shoe of claim 1 wherein each of said junctures is concaved and extends into the inner portion of said rubber grouser portion to provide a bottom extremity that is located below the tip of the adjacent steel grouser bar.

3. The rubber grousered track shoe of claim 2 wherein said top face of said outer portion of said rubber grouser portion is provided with a width that is less than the lateral separation of said first and second steel grouser bars and each of said side faces is inclined from its respective juncture to said top face.

4. The rubber grousered track shoe of claim 3 wherein said steel shoe portion has at least two bolt holes disposed through said planar surface and said rubber grouser portion is discontinuous about said bolt holes, forming an open, bolt receiving cavity about said bolt holes.

5. The rubber grousered track shoe of claim 4 wherein said rubber grouser portion has opposite ends, each end having a stepped configuration with a vertical portion extending from the bottom of the inner portion to a height approximately equal to the height of said tips of said steel grouser bars, a horizontal portion extending inwardly from said vertical portion and an inclined portion extending from said horizontal portion to said top face of said outer portion of said rubber grouser portion.

6. The rubber grousered track shoe of claim 5 wherein said steel grouser bars are at a predetermined equal height above said planar surface and said rubber grouser portion has a height that is between 1.3 and 1.6 times the height of said steel grouser bars.

\* \* \* \* \*